(12) United States Patent
Ryan et al.

(10) Patent No.: US 8,540,872 B1
(45) Date of Patent: Sep. 24, 2013

(54) PORTABLE WATER TREATMENT PLANT

(75) Inventors: Christopher J. Ryan, Pleasant Valley, NY (US); Andrew J. Castro, Lagrangeville, NY (US); Daniel W. Eellers, III, Brown Deer, WI (US); Neal A. Verdegan, Greenfield, WI (US)

(73) Assignees: Watertronics, LLC, Hartland, WI (US); World Water Solutions, LLC, Poughkeepsie, NY (US)

( * ) Notice: Subject to any disclaimer, the term of this patent is extended or adjusted under 35 U.S.C. 154(b) by 747 days.

(21) Appl. No.: 12/775,914

(22) Filed: May 7, 2010

Related U.S. Application Data

(60) Provisional application No. 61/176,892, filed on May 9, 2009.

(51) Int. Cl.
 *B01D 61/12* (2006.01)
(52) U.S. Cl.
 USPC ....... 210/91; 210/143; 210/195.2; 210/257.2; 210/254; 210/258; 210/321.69
(58) Field of Classification Search
 USPC ................ 210/321.69, 106, 108, 85, 91, 143, 210/195.2, 257.2, 258, 259, 341, 254, 340
 See application file for complete search history.

(56) References Cited

U.S. PATENT DOCUMENTS

| | | | |
|---|---|---|---|
| 5,160,429 A | 11/1992 | Ohmi et al. | |
| 5,244,579 A * | 9/1993 | Horner et al. | 210/652 |
| 5,928,503 A * | 7/1999 | Shang-Chun | 210/86 |
| 6,349,835 B1 * | 2/2002 | Saux et al. | 210/427 |
| 7,638,042 B2 * | 12/2009 | Astle et al. | 210/85 |
| 2008/0245738 A1 * | 10/2008 | Coulter | 210/650 |

OTHER PUBLICATIONS

A brochure describing a Sunspring brand microbiological water purifier, 2008.

* cited by examiner

*Primary Examiner* — Terry Cecil
(74) *Attorney, Agent, or Firm* — Donald J. Ersler

(57) ABSTRACT

A portable water treatment plant includes a membrane filter, a booster pump and a pressurized water tank. The membrane filter preferably receives water through a pump in a screen filter, but could receive water from other sources. The booster pump pumps water from an output of the membrane filter into the pressurized water tank. The water from the membrane filter is preferably pumped through at least one carbon filter for additional filtering. An air compressor is used to inject air into a backwash solution. An auxiliary inlet and an auxiliary outlet are created to receive a removable reverse osmosis filter. An electronic controller includes a touch screen monitor, which provides control of and displays various information concerning the portable water treatment plant. The electronic controller senses the insertion of the reverse osmosis filter into the portable water treatment plant. Chemicals in the cleaning solutions are neutralized before discharge.

15 Claims, 2 Drawing Sheets

PORTABLE WATER TREATMENT PLANT

CROSS-REFERENCES TO RELATED APPLICATIONS

This is a nonprovisional application taking priority from provisional application No. 61/176,892 filed on May 9, 2009.

BACKGROUND OF THE INVENTION

1. Field of the Invention

The present invention relates generally to water treatment and more specifically to a portable water treatment plant, which allows a reverse osmosis filter system to be plugged into the water treatment plant without any additional action required of a user.

2. Discussion of the Prior Art

U.S. Pat. No. 5,160,429 to Ohmi et al. discloses a piping system for supplying ultra-pure water. The Ohmi et al. patent includes a piping system for supplying ultra-pure water, which comprises a circulation tank to store primary pure water from a primary pure water producing unit and a pump for sending the primary pure water from the circulation tank.

Accordingly, there is a clearly felt need in the art for a portable water treatment plant, which allows a reverse osmosis filter system to be plugged into the water treatment plant without any additional action required of a user and which includes only one pressurized water tank for supplying drinking water and water for creating backwashing solutions.

SUMMARY OF THE INVENTION

The present invention provides a portable water treatment plant, which includes only one pressurized water tank for supplying water for rinsing, creating a backwash solution and drinking water. The portable water treatment plant includes a membrane filter, a booster pump and a pressurized water tank. The membrane filter preferably receives water through a pump contained in a screen filter, but could receive water from other sources. The booster pump pumps water from an output of the membrane filter into the pressurized water tank. The water from the membrane filter is preferably pumped through at least one carbon filter for additional filtering.

An auxiliary inlet and an auxiliary outlet are preferably located between the at least one carbon filter and the pressurized water tank. The auxiliary inlet and auxiliary outlet are created to receive a removable reverse osmosis filter system (removable RO filter system). An electronic controller senses the insertion of the reverse osmosis filter into the portable water treatment plant. The electronic controller is also used to open and close various valves to allow the membrane filter to be flushed with water from the pressurized water tank through a recirculation loop without contaminating the booster pump or the at least one carbon filter. The electronic controller includes a touch screen monitor and custom software. The electronic controller provides control of and displays various information concerning the portable water treatment plant.

Chemical substances are injected into feed water from a water source to create recirculation cleaning solutions for cleaning the membrane filter and recirculation loop. The pressurized water in the pressurized water tank does not require an additional booster pump to flush the recirculation loop or to create a solution for backwashing the membrane filter or to deliver water to an end user. An air compressor is used to inject air into a backwash solution for air scouring particles out-of the membrane filter. Pressurized water in the pressurized water tank is used to flush the recirculation loop and membrane filter after cleaning, creating a solution for backwashing the membrane filter and providing drinking water. The drinking water is filtered with the membrane filter and may be treated with the removable reverse osmosis filter system. The filtered drinking water and the reverse osmosis filtered drinking water are both stored in the pressurized water tank.

Accordingly, it is an object of the present invention to provide a portable water treatment plant, which allows a removable RO filter system to be plugged into the water treatment plant without any additional action on the part of the user.

Finally, it is another object of the present invention to provide a portable water treatment plant, which enables water to be supplied for backwashing a membrane filter without the need for an additional booster pump.

These and additional objects, advantages, features and benefits of the present invention will become apparent from the following specification.

DETAILED DESCRIPTION OF THE PREFERRED EMBODIMENTS

Figure 1:
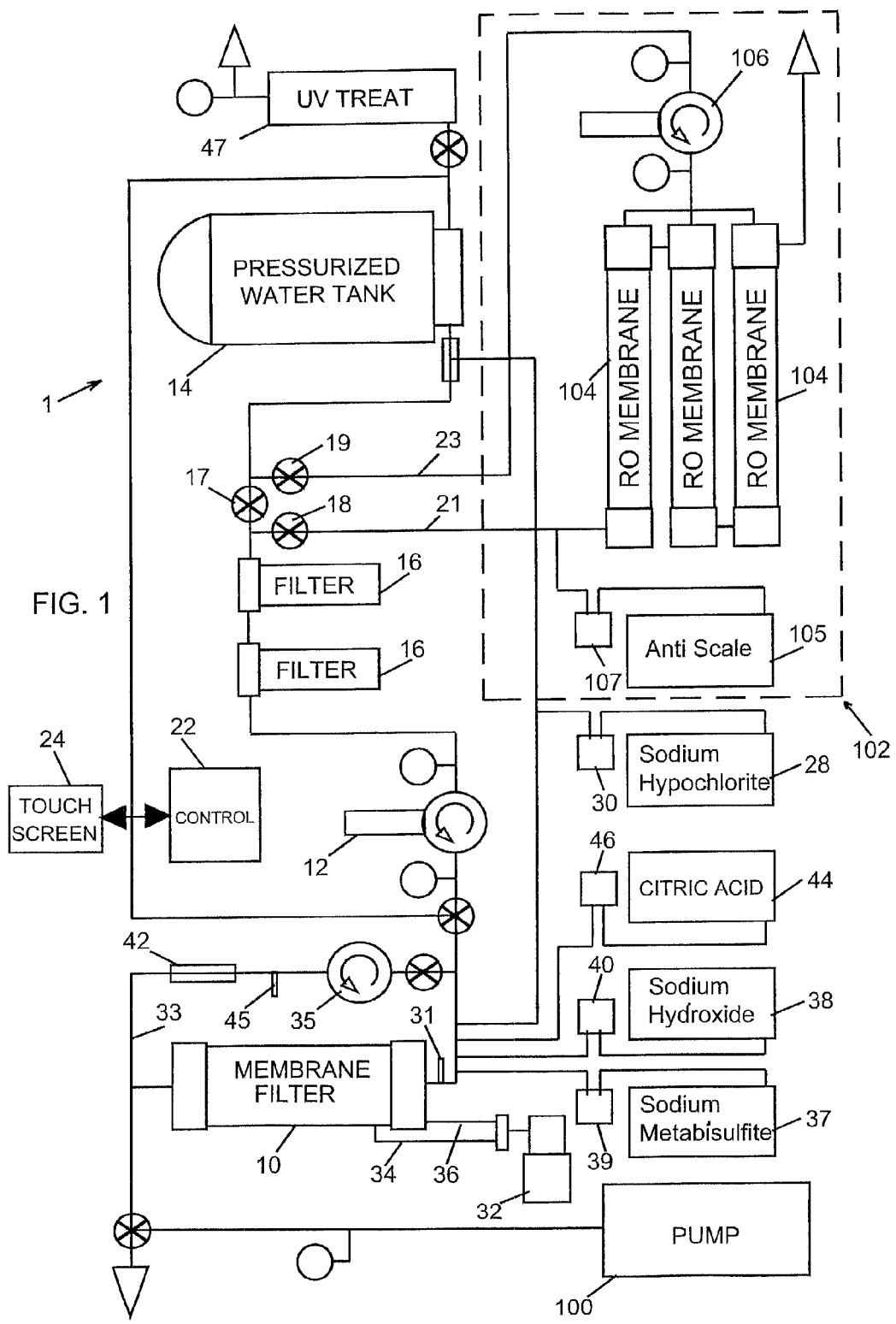
FIG. 1 is a schematic diagram of a portable water treatment plant in accordance with the present invention.

With reference now to the drawings, and particularly to FIG. 1, there is shown a schematic diagram of a portable water treatment plant 1. The portable water treatment plant 1 includes a membrane filter 10, a booster pump 12 and a pressurized water tank 14. The membrane filter 10 preferably receives water through a submerged pump 100 contained in a screen filter, but could receive water from any other source. The booster pump 12 pumps water from the membrane filter 10 into the pressurized water tank 14. It is preferable to have at least one carbon filter 16 located between the booster pump 12 and the pressurized water tank 14 for additional filtering.

A diverting valve 17, an auxiliary input valve 18 and an auxiliary output valve 19 are used to interrupt the flow of water from the at least one carbon filter 16 to the pressurized water tank 14. The diverting valve 17 is closed, the auxiliary input valve 18 is opened and the auxiliary output valve 19 is opened to divert water flow to a removable reverse osmosis filter system (removable RO filter system) 102. The removable RO filter system includes an auxiliary inlet line 21 and an auxiliary outlet line 23. The auxiliary input valve 18 provides flow to the auxiliary inlet line 21 and the auxiliary output valve 19 receives flow from the auxiliary outlet line 23. The diverting, auxiliary input and auxiliary output valves are manually operated by a user, but could be electrically operated by an electronic controller 22.

Figure 2:
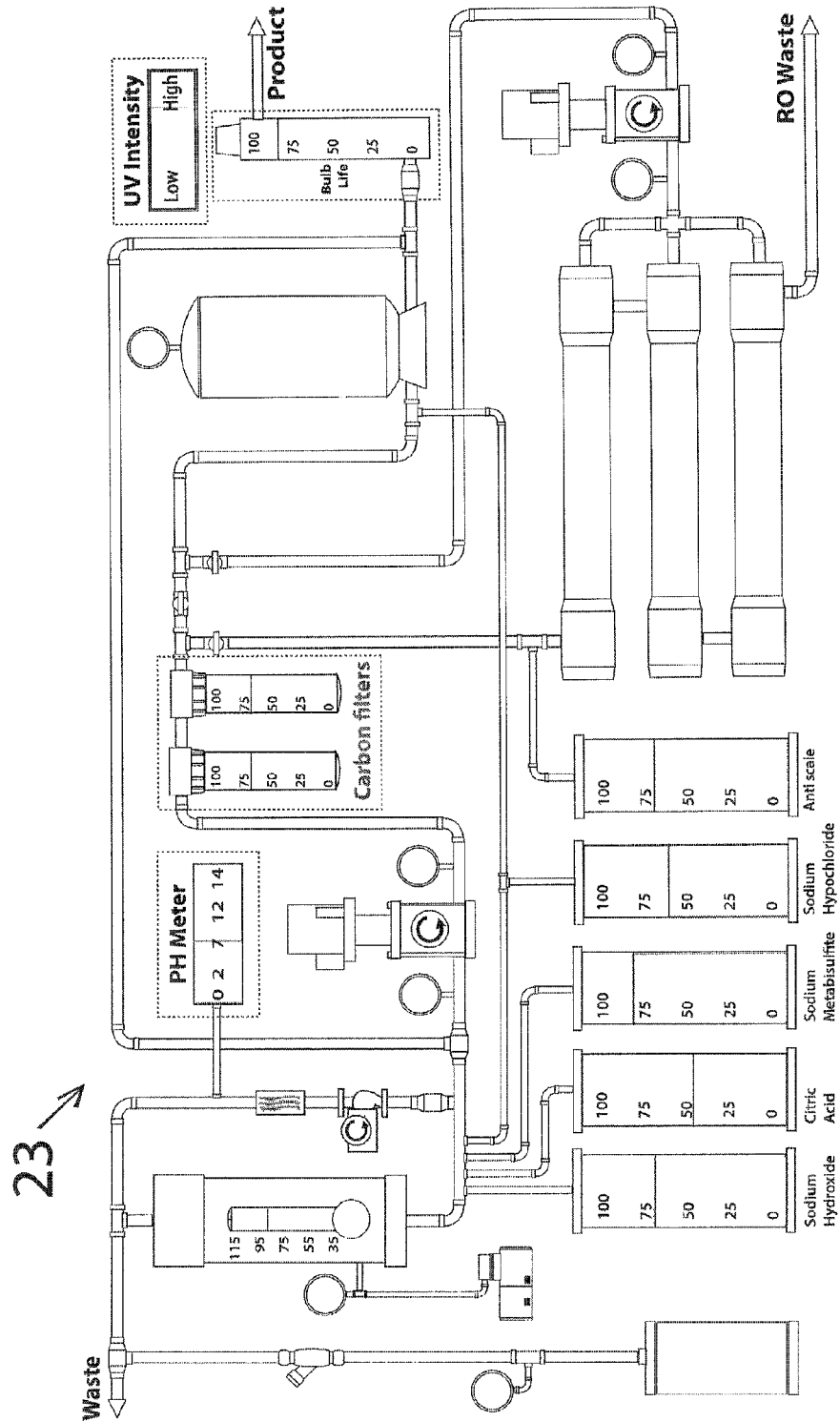
FIG. 2 is a touch screen display representing the present conditions of a portable water treatment plant in accordance with the present invention.

With reference to FIG. 2, the electronic controller 22 is preferably a microprocessor based device with custom software and a touch screen 24. Microprocessor based controllers are well known in the art and need not be explained in detail. The electronic controller 22 monitors system parameters and removable RO filter system parameters, and the parameters are displayed on the touch screen 24, such as pressures, solution usages and other data concerning items 10, 12, 14, 16, 17, 18, 19, 20, 26, 28, 30, 32, 33, 34, 35, 36, 37, 38, 39, 40, 42, 44, 45, 46, 47, 104 and 106. The electronic controller 22 also allows a user to modify operations of the portable water treatment plant 1, such as cleaning the membrane filter 10. The electronic controller 22 also, allows remote monitoring of portable treatment plant through the internet. The electronic controller 22 senses the insertion of the removable RO filter system 102 by connection of a data line (not shown) of the removable RO filter system 102. The removable RO filter system 102 preferably includes at least one membrane filter 104 and a RO booster pump 106. Water flow through the at least one membrane filter 104 is arranged in a series configuration. A portion of the water that flows through the at least three membrane filters 104 goes to waste. The electronic controller 22 also eliminates the need for a separate controller for the removable RO filter system 102. Normally, reverse osmosis filtering requires a separate plant. However, the "plug & play" capability of the portable water treatment plant 1 allows the removable RO filter system 102 to use existing components in the portable water treatment plant 1. Preferably, an anti-scale solution is injected into the auxiliary input line 21 through an anti-scale pump 107 from an anti-scale tank 105 for use in the removable RO filter system 102.

The electronic controller 22 opens and closes various valves and operates various devices for cleaning of the membrane filter 10. Pressurized water from the pressurized water tank 14 is used to backwash the membrane filter 10. The pressurized water travels to the membrane filter without the need for a booster pump. Sodium Hypochlorite (chlorine) from the chlorine tank 28 is injected into the pressurized water through a chlorine pump 30 to form a chlorinated solution. Chlorine is preferably injected into the drinking water in an amount of approximately 2 ppm.

An air compressor 32 is used to inject air into the chlorinated solution. Backwashing includes the injection of air into the backwashing solution. The air in the chlorinated solution scours particles out of the lumens in the membrane filter 10 through an air scour line 34. The air compressor 32 is also used to test pressure integrity of the membrane filter 10 through an air pressure test line 36. A pressure transducer 31 provides data to the electronic controller 22 concerning the integrity of the membrane filter 10.

A chlorine neutralizing solution, such as sodium metabisulfite is injected into a chlorinated solution with a neutralizing pump 39 from a neutralizing tank 37, after the cleaning of the membrane filter 10 and recirculation loop 33.

A recirculation pump 35 in the recirculation loop 33 is used to circulate any liquid or solution through the membrane filter 10. One end of the recirculation loop 33 is connected to an input of the membrane filter 10 and the other end of the recirculation loop 33 is connected to an output of the membrane filter 10. The recirculation loop is closed to the rest of the portable water treatment plant 1 with at least one valve, when the membrane filter 10 is being cleaned with cleaning solutions contained in the recirculation loop 33.

A caustic solution, such as sodium hydroxide from sodium hydroxide tank 38 may be injected into the chlorinated solution through a caustic pump 40 to form a caustic chlorinated solution. The caustic chlorinated solution is preferably heated with a heater unit 42 during cleaning of the membrane filter 10 with the recirculation loop 33. The heater unit 42 is retained in-line in the recirculation loop 33. The caustic solution is neutralized with citric acid from a citric acid tank 44 and sodium metabisulfite. The pressurized water is used to flush the neutralized caustic chlorinated solution out-of the membrane filter 10 and the recirculation loop 33.

Citric acid from the citric acid tank 44 is injected into the pressurized water through a citric acid pump 46 to form a citric solution. The citric solution is preferably heated with the heater unit 42 during cleaning of the membrane filter 10 through the recirculation loop 33. The citric acid is neutralized with the caustic solution. The pressurized water is used to flush the neutralized citric solution out-of the membrane filter 10 and recirculation loop 33.

Cleaning the membrane filter 10 through the recirculation loop 33 or backwashing may occur during different time cycles, such as several times a day, every day, every month and every three months. The pressurized water tank 14 provides pressurized water for chlorinated backwashing the membrane filter 10; flushing the membrane filter 10 and recirculation loop 33 after cleaning; ultra-filtered drinking water from the membrane filter 10; and reverse osmosis filtered drinking water. An Ultraviolet (UV) sterilization device 47 is used to provide additional disinfection against biological contamination in the pressurized drink water supply.

A PH meter 45 is located in-line in the recirculation loop 33 to check proper chemical level during cleaning process and to check neutralization of cleaning solutions in the recirculation loop 33 prior to the water flush.

The portable water treatment plant 1 includes items 10-47, which are contained on a single platform and preferably enclosed. The single platform may be transported from one location to another with a forklift or the like.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A portable water treatment plant comprising:
    a membrane filter for filtering water from a source of water;
    a pressurized water tank for storing pressurized water;
    at least one removable reverse osmosis filter;
    a first flow path includes water flow from said membrane filter to said at least one removable reverse osmosis filter to be filtered thereby and then delivering the reverse osmosis filtered water into said pressurized water tank;
    a second flow path includes water flow from said membrane filter to said pressurized water tank without passing through any reverse osmosis filter;
    at least one valve positioned for receiving water filtered by said membrane filter;
    a booster pump for pumping water from said membrane filter into one of said pressurized water tank and said at least one removable reverse osmosis filter; and
    an electronic controller configured to (i) sense the presence of said removable reverse osmosis filter when connected to said portable water treatment plant, and (ii) to operate said at least one valve to direct water flow into said first flow path only when said at least one removable reverse osmosis filter is present instead of into said second flow path.

2. The portable water treatment plant of claim 1, further comprising:
    a measure of chlorine is added to said pressurized water to form a chlorinated solution, an air compressor for adding air to said chlorinated solution.

3. The portable water treatment plant of claim 1 wherein:
    a recirculation loop is connected between an input and an output of said membrane filter.

4. The portable water treatment plant of claim 1, further comprising:
    said controller including a touch screen, said touch screen monitors system parameters and displays the system parameters, said touch screen allows a user to modify the operation of said portable water treatment plant.

5. The portable water treatment plant of claim 4, further comprising:
said touch screen allows said portable water treatment plant to be monitored through the internet.

6. A portable water treatment plant comprising:
a membrane filter for filtering water from a source of water;
a pressurized water tank for storing pressurized water;
at least one removable reverse osmosis filter;
a first flow path includes water flow from said membrane filter to said at least one removable reverse osmosis filter to be filtered thereby and then delivering the reverse osmosis filtered water into said pressurized water tank;
a second flow path includes water flow from said membrane filter to said pressurized water tank without passing through any reverse osmosis filter;
at least one valve positioned for receiving water filtered by said membrane filter;
a booster pump for pumping water from said membrane filter into one of said pressurized water tank and said at least one removable reverse osmosis filter;
at least one carbon filter is inserted between said booster pump and said pressurized water tank; and
an electronic controller configured to (i) sense the presence of said removable reverse osmosis filter when connected to said portable water treatment plant, and (ii) to operate said at least one valve to direct water flow into said first flow path only when said at least one removable reverse osmosis filter is present instead of into said second flow path.

7. The portable water treatment plant of claim 6, further comprising:
a measure of chlorine is added to said pressurized water to form a chlorinated solution, an air compressor for adding air to said chlorinated solution.

8. The portable water treatment plant of claim 6 wherein:
a recirculation loop is connected between an input and an output of said membrane filter.

9. The portable water treatment plant of claim 6, further comprising:
said controller including a touch screen, said touch screen monitors system parameters and displays the system parameters, said touch screen allows a user to modify the operation of said portable water treatment plant.

10. The portable water treatment plant of claim 9, further comprising:
said touch screen allows said portable water treatment plant to be monitored through the internet.

11. A portable water treatment plant comprising:
a membrane filter for filtering water from a source of water, wherein a measure of chlorine is added to said pressurized water to form a chlorinated solution, said chlorinated solution is used to backwash said membrane filter;
a pressurized water tank for storing pressurized water;
at least one removable reverse osmosis filter;
a first flow path includes water flow from said membrane filter to said at least one removable reverse osmosis filter to be filtered thereby and then delivering the reverse osmosis filtered water into said pressurized water tank;
a second flow path includes water flow from said membrane filter to said pressurized water tank without passing through any reverse osmosis filter;
at least one valve positioned for receiving water filtered by said membrane filter;
a booster pump for pumping water from said membrane filter into one of said pressurized water tank and said at least one removable reverse osmosis filter; and
an electronic controller configured to (i) sense the presence of said removable reverse osmosis filter when connected to said portable water treatment plant, and (ii) to operate said at least one valve to direct water flow into said first flow path only when said at least one removable reverse osmosis filter is present instead of into said second flow path.

12. The portable water treatment plant of claim 11, further comprising:
an air compressor for adding air to said chlorinated solution.

13. The portable water treatment plant of claim 11 wherein:
a recirculation loop is connected between an input and an output of said membrane filter.

14. The portable water treatment plant of claim 11, further comprising:
said controller including a touch screen, said touch screen monitors system parameters and displays the system parameters, said touch screen allows a user to modify the operation of said portable water treatment plant.

15. The portable water treatment plant of claim 14, further comprising:
said touch screen allows said portable water treatment plant to be monitored through the internet.

* * * * *